United States Patent Office 3,538,031
Patented Nov. 3, 1970

3,538,031
ADHESIVE COMPOSITIONS
Alvist V. Rice, Weatherford, Tex., assignor to The Smithers-Oasis Company, Kent, Ohio, a corporation of Ohio
No Drawing. Filed May 2, 1968, Ser. No. 726,223
Int. Cl. C08d 9/12
U.S. Cl. 260—27
5 Claims

ABSTRACT OF THE DISCLOSURE

Adhesive compositions for floral and general purpose applications comprising fluorinated solvents and solvent mixtures containing fluorinated solvents in combination with appropriate tackifiers, desirable additives and selected block copolymers bases which are unexpectedly soluble in such solvents.

BACKGROUND OF THE INVENTION

This invention relates to adhesive compositions which are particularly suitable for use in the floral industry in the creation and assembly of floral displays. Foamed styrene plastic has been accepted widely among florists for use as backing or support members upon which floral pieces and arrangements for display may be mounted. Many adhesives and bonding agents contain solvents which are not compatible with foamed styrene plastic, but which react with the plastic to dissolve or disfigure it and consequently are not suitable for such use.

In addition to the requirement of compatibility between the adhesive and the plastic support member, in assembling displays it is highly desirable to have a rapid-drying adhesive or bonding agent since time is an important factor in the economic aspect of merchandising floral displays. The formation or ribbons into various pleated and other configurations requires rapid drying of the bonding agent as does the application of conventional glitter particles. Other desirable features of a floral adhesive are the ability to adhere to fresh flower petals without toxic effects and to be waterproof.

Much atention has been focused currently on the practice of glue-sniffing. Glue-sniffing is the voluntary inhalation of the fumes or vapors from model airplane glue or other compounds containing aromatic hydrocarbons. The toxic substances most commonly found in such compounds are a combination of highly volatile solvents such as hexene (hydrocarbon); benzene, toluene and xylene (aromatic hydrocarbons); carbon tetrachloride, chloroform cyclohexane, methyl ethyl ketone and methylisobutyl ketone (ketones); amyl acetate, butyl acetate, ethyl acetate and tricresyl phosphate (esters); butyl alcohol, ethyl alcohol and isopropyl alcohol (alcohols); and methylcellosolve acetate (glycol). The sniffing of these substances is a major behavorial problem to school, health and law-enforcement officials as well as to parents, and some jurisdictions have attempted to ban the sale or possession of such compounds to persons under 21 years of age without the consent of a parent or guardian. For this reason it is desirable to eliminate the toxic substances from adhesive compounds, but at present the only glues which are non-toxic are water-base glues.

SUMMARY

The present invention provides adhesive compositions which are waterproof and rapid-drying. The adhesives adhere to fresh flower petals and have low flammability and low toxicity.

The compositions of the invention are obtained by combining block copolymer bases with fluorinated solvents, fluorinated solvent azeotropes and mixtures which are compatible with such block copolymer bases, suitable tackifiers, and desirable additives. Specific compositions formulated include 1 part by weight of a styrene-butadiene block copolymer elastomer base
1 part by weight of a styrene-indene-isoprene terpolymer resinous tackifier, and
2 to 12 parts by weight (depending upon the viscosity desired) of a solvent comprising substantially
  50% trichlorotrifluoroethane
  45% dichloromethane
  5% methanol, and
2 parts by weight of a styrene-butadiene block copolymer elastomer base
2 parts by weight of a tackifier comprising equal parts of
  a styrene-indene-isoprene terpolymer, and
  a pentaerythritol ester of hydrogenated rosin, and
2 to 24 parts by weight (depending upon the viscosity desired) of a trichloromono-fluoromethane solvent

DESCRIPTION OF THE PREFERRED EMBODIMENT

The rubber-base adhesives of the present invention were conceived as a result of efforts to produce adhesive compositions for use in the floral industry with ultra-fast drying time and a compatibility with the foamed styrene plastic support members conventionally used for floral displays. Such adhesives must be waterproof and preferably be of low toxicity so that they can be used to adhere fresh flower petals without damage and to obviate the current widespread objection to glue solvents used for glue-sniffing purposes.

The adhesive compositions comprise a base, a tackifier, and a solvent. The base is an elastomer; the tackifier is a resin; and the solvent is a fluorinated mixture. A suitable composition for the base is found in certain commercially available styrene-butadiene block copolymers marketed under the trade names Kraton 101 and 102. Kraton 107, which is an isoprenebutadiene block copolymer is also suitable. These elastomers are relatively new and require no vulcanization, yet display most of the properties of conventional vulcanized polymers. The compositions exist in solid form as porous balls ¼" to ½" in diameter of a density between conventional foam rubber and solid rubber. These copolymers provide the cohesive strength and flexibility of the adhesive composition.

The tackifier, which is primarily resinous, is a styrene-indene-isoprene terpolymer which may be procured commercially under the trade name of Velsicol XL–30. The tackifier exists in solid flake form typically ¼" in diameter by ⅟₁₆" thickness. This plastic resin provides the stickiness to the adhesive composition. Another tackifier composition used in one embodiment of the invention is a pentaerythritol ester of hydrogenated rosin available commercially under the trade name Floral 105.

The solvents used in the adhesive compositions of the present invention are fluorinated solvents, fluorinated solvent azeotropes, and mixtures of these solvents which act upon the selected block copolymer bases. Unlike aromatic hydrocarbon solvents and other solvents conventionally used, the solvents of the present invention are very low in toxicity and flammability. The compositions formed from such solvents are rapid drying and waterproof. The solvents have very low surface tension and act to clean the surfaces as the adhesive is applied. Surfaces upon which the adhesives of the present invention are applied do not have to be pretreated or cleaned as with many other adhesives.

One such solvent is a mixture of substantially 50% trichlorotrifluoroethane, 45% dichloromethane and 5% methanol. Another suitable solvent is trichloromono-fluoromethane.

A first embodiment of the invention consists of a relatively thin liquid adhesive composition which is particularly suitable for dipping flower stems which are to be secured to a foamed styrene plastic support in a floral display. This composition comprises one part by weight of a styrene-indeneisoprene terpolymer tackifier, and 7 parts by weight of a solvent which comprises substantially 50% trichlorotrifluoroethane, 45% dichloromethane and 5% methanol. The low viscosity and ultrafast drying time make it possible to assemble floral displays in permanent form as rapidly as the stems can be dipped in the adhesive and forced into the plastic support.

A second embodiment of the invention is suitable for floral use as well as general purpose uses because of the high viscosity. This embodiment comprises 1 part by weight of a styrene-butadiene block copolymer base, 1 part by weight of a styrene-indene-isoprene terpolymer tackifier, and 3 parts by weight of a solvent including substantially 50% trichlorotrifluoroethane, 45% dichloromethane and 5% methanol.

The viscosity of these adhesive compositions may be varied by varying the proportions of the solvent. A satisfactory range of variation in parts by weight of solvent is 2 to 12, and the various adhesive compositions produced in such range of solvent proportions find various applications in the floral industry and general purpose use. Because of its low toxicity, such adhesive is particularly suitable for hobby crafts in which glue is to be used by young people who may be exposed to the temptation of glue-sniffing.

A third embodiment of the invention is suitable for floral and general purpose use as a contact adhesive for foamed styrene plastic. This embodiment comprises two parts by weight of a styrene-butadiene block copolymer base, one part by weight of a styrene-indene-isoprene terpolymer tackifier, one part by weight of a pentaerythritol ester of hydrogenated rosin tackifiers, 0.04 part by weight of 1,3,5 - trimethyl-2,4,6-tris(3,5-di-tert-butyl-4-hydroxybenzyl) benzene stabilizer, and two to twenty-four parts by weight of a trichloromonofluoromethane solvent. The amount of solvent is determined by the viscosity requirement of the particular application.

While the invention has been shown and described with particular reference to preferred embodiments, it will be understood by those skilled in the art that various changes in form and details may be made without departing from the spirit and scope of the invention.

What is claimed is:
1. An adhesive composition comprising
   1 part by weight of a styrene-butadiene block copolymer elastomer base,
   1 part by weight of a styrene-indene-isoprene terpolymer resinous tackifier, and
   2 to 12 parts by weight of a solvent comprising substantially
      50% trichlorotrifluoroethane
      45% dichloromethane
      5% methanol.
2. The combination according to claim 1 wherein said solvent comprises 7 parts by weight of the adhesive composition.
3. The combination according to claim 1 wherein said solvent comprises 3 parts by weight of the adhesive composition.
4. An adhesive composition comprising
   2 parts by weight of a styrene-butadiene block copolymer elastomer base,
   2 parts by weight of a tackifier comprising equal parts of
      a styrene-indene-isoprene terpolymer, and
      a pentaerythritol ester of hydrogenated rosin, and
   2 to 24 parts by weight of a trichloromonofluoromethane solvent.
5. The combination according to claim 4 further comprising
   0.04 part by weight of a 1,3,5-trimethyl-2,4,6-tris(3,5-di-tert-butyl-4-hydroxy benzyl) benzene stabilizer.

References Cited

UNITED STATES PATENTS

| | | | |
|---|---|---|---|
| 2,066,079 | 12/1936 | Shoub | 260—33.8 |
| 2,659,704 | 11/1953 | Kerr | 260—33.8 |
| 3,168,492 | 2/1965 | Doyle et al. | 260—45.95 |
| 3,239,478 | 3/1966 | Harlan | 260—27 |
| 3,441,530 | 4/1969 | Bauer et al. | 260—880 |
| 3,400,095 | 9/1968 | Kremer et al. | 260—33.8 |

FOREIGN PATENTS 903,331   8/1962   Great Britain.

DONALD E. CZAJA, Primary Examiner

W. E. PARKER, Assistant Examiner

U.S. Cl. X.R.

260—33.8, 45.95, 876, 880